US012653099B2

(12) United States Patent
Zhu

(10) Patent No.: US 12,653,099 B2
(45) Date of Patent: Jun. 16, 2026

(54) POWER TOOL

(71) Applicant: JIANGSU DONGCHENG TOOLS TECHNOLOGY CO., LTD., Nantong (CN)

(72) Inventor: Yunjia Zhu, Nantong (CN)

(73) Assignee: JIANGSU DONGCHENG TOOLS TECHNOLOGY CO., LTD., Nantong (CN)

( * ) Notice: Subject to any disclaimer, the term of this patent is extended or adjusted under 35 U.S.C. 154(b) by 126 days.

(21) Appl. No.: 18/523,869

(22) Filed: Nov. 29, 2023

(65) Prior Publication Data

US 2024/0090374 A1    Mar. 21, 2024

Related U.S. Application Data

(63) Continuation of application No. PCT/CN2022/141961, filed on Dec. 26, 2022.

(30) Foreign Application Priority Data

Aug. 30, 2022    (CN) ......................... 202211058281.7

(51) Int. Cl.
*A01D 34/90* (2006.01)
*A01D 69/02* (2006.01)
*B25F 5/00* (2006.01)

(52) U.S. Cl.
CPC ............. *A01D 34/90* (2013.01); *A01D 69/02* (2013.01); *B25F 5/008* (2013.01)

(58) Field of Classification Search
CPC ................................ A01D 34/90; B25F 5/008
(Continued)

(56) References Cited

U.S. PATENT DOCUMENTS 4,860,451 A * 8/1989 Pilatowicz ........... A01D 34/902
30/276
7,768,750 B2 8/2010 Uchida
(Continued)

FOREIGN PATENT DOCUMENTS

CN    208301544 U    1/2019
CN    209283028 U    8/2019
(Continued)

OTHER PUBLICATIONS

Chinese First Office Action, Chinese Application No. 202211058281.7, mailed Jun. 28, 2023 (13 pages).
(Continued)

*Primary Examiner* — David J Parsley

(57) ABSTRACT

A power pool, includes a housing, defining an air inlet and a heat-dissipation vent; a motor comprising a front end and a rear end; a heat-dissipation fan, mounted at the rear end of the motor and capable of being driven by the motor to rotate and generate a negative pressure, wherein a motor heat-dissipation passage; a control board, arranged in the receiving space and located at a rear side of the motor, and configured to control an operation of the motor; wherein the housing is provided with a partition extending from an inner wall into the receiving space, the partition is located between the motor and the control board to enable the control board independent of the motor heat-dissipation passage, the partition separates the heat-dissipation vent into a first heat-dissipation vent and a second heat-dissipation vent, and a ventilation hole facing the heat-dissipation fan is defined in the partition.

17 Claims, 2 Drawing Sheets

(58) Field of Classification Search
USPC ............................................................ 30/276
See application file for complete search history.

(56) References Cited

U.S. PATENT DOCUMENTS

| | | | |
|---|---|---|---|
| 9,517,555 B2 * | 12/2016 | Racov ..................... | A01D 34/90 |
| 10,350,743 B2 * | 7/2019 | Fu ........................... | B25F 5/008 |
| 11,621,613 B2 * | 4/2023 | Chung ................... | B25F 5/008 |
| | | | 310/50 |
| 2008/0315693 A1 | 12/2008 | Uchida | |
| 2009/0245958 A1 * | 10/2009 | Lau ......................... | B25F 5/008 |
| | | | 173/217 |
| 2013/0313925 A1 | 11/2013 | Mergener et al. | |
| 2015/0041167 A1 * | 2/2015 | Yamaguchi ............ | H02K 21/24 |
| | | | 173/217 |
| 2021/0299844 A1 * | 9/2021 | Alexandersson ...... | A01G 3/053 |
| 2023/0397531 A1 * | 12/2023 | Yamaoka ............. | A01D 34/902 |

FOREIGN PATENT DOCUMENTS

| | | | |
|---|---|---|---|
| CN | 110651588 A | 1/2020 | |
| CN | 211671440 U | 10/2020 | |
| CN | 111953092 A | 11/2020 | |
| CN | 212012397 U | 11/2020 | |
| CN | 215392873 U | 1/2022 | |
| CN | 216292179 U | 4/2022 | |
| CN | 115336460 A | 11/2022 | |
| DE | 102012110919 | * | 5/2014 |

OTHER PUBLICATIONS

International Search Report, International Application No. PCT/CN2022/141961, mailed May 26, 2023 (19 pages).

* cited by examiner

POWER TOOL

CROSS REFERENCE TO RELATED APPLICATIONS

The present disclosure is a continuation of International (PCT) Patent Application No. PCT/CN2022/141961 filed on Dec. 26, 2022, which claims priority to Chinese Patent Application No. 202211058281.7, filed on Aug. 30, 2022, the entire contents of which are hereby incorporated by reference in their entireties.

TECHNICAL FIELD

The present disclosure relates to the technical field of power tools, and in particular to a direct circuit (DC) brushless power tool.

BACKGROUND

A power tool using electrical power as an energy source generally includes a battery pack, a motor powered by the battery pack, an operating head driven by the motor, and a transmission mechanism arranged between the motor and the operating head. With the development of science and technology, usage of high-voltage lithium batteries is becoming more and more common, and brushless motors are increasingly favored by power tool manufacturers due to high energy efficiencies and low dead weights. However, the brushless motors require larger control boards, and traditional layouts of the motors and the control boards are unreasonable, resulting in heat generated by the motors and the control boards in the process of operating failing to be removed, which easily leads to failures and causes damages thereby.

U.S. Pat. No. 7,768,750B of Hitachi, Ltd. of Japan discloses a power tool. The power tool includes a body casing; a battery pack which is detachably attached to the body casing and can supply electrical energy for the power tool, a motor which is housed in the body casing and generates rotation force by the electrical energy of the battery pack; a cooling fan which rotates by the rotation force of the motor to generate a negative pressure and form a passage of cool air, and a protection unit which shuts off the power supply to the motor, in accordance with a detection result of the state of the battery pack, so that the battery pack does not enter an overdischarge state or an overcurrent state. In this patent, the protection unit is located in the passage of the cool air and located at an upstream of the motor along the flowing direction of the cool air. The protection unit is located on a control board, i.e., the control board is placed in the passage of the cool air of the motor and the cool air may cool down and dissipate heat for both the motor and the control board, such that two advantages may be achieved simultaneously. Such configuration resolves a cooling problem of the control board, whereas this configuration may also cause the motor failing to be effectively and timely cooled down due to the control board being blocked before the motor.

In view of the above, an improved power tool is indeed necessary to be provided to overcome defects existing in the related art.

SUMMARY OF THE DISCLOSURE

In response to the defects of the related art, an object of the present disclosure is to provide a power tool.

A technical scheme adopted by the present disclosure to solve the problems of the related art is to provide a power tool. The power tool includes a housing, defining a receiving space inside, and an air inlet and a heat-dissipation vent being defined on the housing; a motor, received in the receiving space, including a front end and a rear end, and configured to output a rotation power through the front end; a heat-dissipation fan, mounted at the rear end of the motor and capable of being driven by the motor to rotate and generate a negative pressure, and wherein a motor heat-dissipation passage in which a first airflow is capable of flowing from the air inlet to the heat-dissipation vent is formed in the receiving space; a control board, arranged in the receiving space and located at a rear side of the motor, and configured to control an operation of the motor; wherein the housing is provided with an inner wall and a partition extending from the inner wall into the receiving space, the partition is located between the motor and the control board and configured to enable the control board to be independent of the motor heat-dissipation passage and separate the heat-dissipation vent into a first heat-dissipation vent adjacent to the motor and a second heat-dissipation vent adjacent to the control board, wherein a ventilation hole facing the heat-dissipation fan is defined in the partition, the second heat-dissipation vent, the ventilation hole, and the first heat-dissipation vent form a control-board heat-dissipation passage, and the control board is located in the control-board heat-dissipation passage.

Another technical scheme of the present disclosure is to provide a power tool. The power tool includes a housing, defining an air inlet and a heat-dissipation vent; a motor, received in the housing and disposed adjacent to the first heat-dissipation vent, comprising a front end and a rear end, and configured to output a rotation power through the front end; a heat-dissipation fan, mounted at the rear end of the motor and capable of rotating and generating a negative pressure; a control board, arranged in the housing, located at a rear side of the heat-dissipation fan, and disposed adjacent to the second heat-dissipation vent; wherein the housing comprises a partition, the partition separates the heat-dissipation vent into a first heat-dissipation vent and a second heat-dissipation vent, and the first heat-dissipation vent is fluidly coupled to the second heat-dissipation vent through the partition; and wherein in case where the heat-dissipation fan rotates and generates a negative pressure, a motor heat-dissipation passage and a control-board heat-dissipation passage independent of the motor heat-dissipation passage are formed, the air inlet is an inlet of a first airflow which is able to flow in the motor heat-dissipation passage, the second heat-dissipation vent is an inlet of a second airflow which is able to flow in the control-board heat-dissipation passage, and the first heat-dissipation vent is an outlet through which the first airflow and the second airflow are capable of flowing out of the motor heat-dissipation passage and the control-board heat-dissipation passage, respectively.

A further technical scheme of the present disclosure is to provide a grass trimmer. The grass trimmer includes a housing, defining a heat-dissipation vent; a motor, received in the housing, comprising a front end and a rear end; a heat-dissipation fan, mounted at the rear end of the motor and capable of rotating and generating a negative pressure; a control board, arranged in the housing, located at a rear side of the heat-dissipation fan; wherein the housing comprises a partition located between the motor and the control board, and the partition separates the heat-dissipation vent into a first heat-dissipation vent and a second heat-dissipation vent adjacent to the first heat-dissipation vent, such that when the heat-dissipation fan rotates and generates a negative pressure, a motor heat-dissipation passage and a control-board heat-dissipation passage non-interfered with the motor heat-dissipation passage are formed, and a first airflow and a second airflow are capable of flowing out of the motor heat-dissipation passage and the control-board heat-dissipation passage respectively, from the first heat-dissipation vent; wherein the motor is disposed in the motor heat-dissipation passage, and the control board is disposed in the control-board heat-dissipation passage.

BRIEF DESCRIPTION OF THE DRAWINGS

Some implementations of the present disclosure are further illustrated in detail in combination with accompanying drawings.

DETAILED DESCRIPTION

Terms used in the present disclosure are solely for a purpose of describing particular embodiments and not intended to limit the present disclosure. For example, terms such as "up", "below", "front", "rear", etc., which indicate orientations or positional relationships, are merely based on orientations or positional relationships shown in accompanying drawings, and are only for convenience to describe the present disclosure and simplifying descriptions, rather than indicate or imply that specified apparatuses/components must have particular orientations or must be constructed or operated in accordance with the particular orientations. Thus, these words cannot be construed as limitations for the present disclosure.

Figure 1:
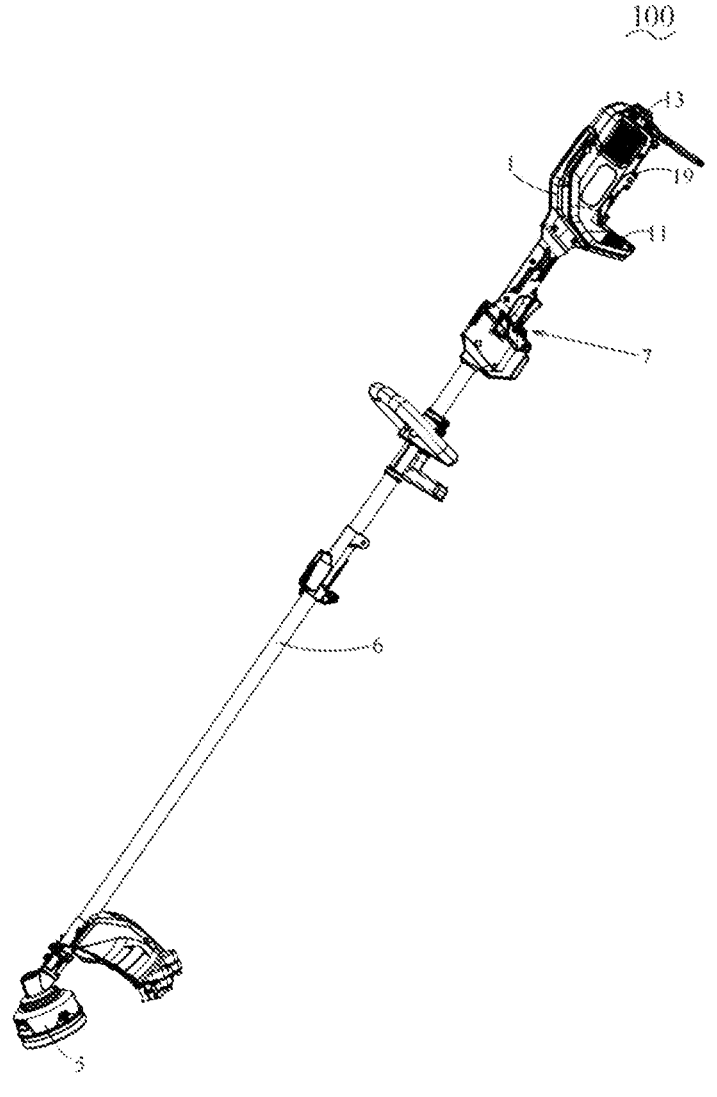
FIG. 1 is a perspective schematic view of a grass trimmer according to an embodiment of the present disclosure.

As shown in FIG. 1, FIG. 1 shows a power tool involved in some embodiments of the present disclosure. In the embodiment, the power tool may be a grass trimmer 100. Of course, in other embodiments, the power tool may also be a garden tool such as a brushcutter, a pruning shear, etc., or a hand-held tool such as a drill, a jig saw, a reciprocating saw, etc. In the embodiment, the grass trimmer 100 includes an energy module, a power module driven by the energy module, a transmission module connected to the power module and configured to transmit power for the power module, an operating head 5 driven by the transmission module, a control module configured to start or stop the grass trimmer 100, and a supporting module configured to assemble these modules together in sequence. The supporting module includes a housing 1 having a receiving space 10, the housing 1 is configured to receive the energy module and accommodate the power module and at least part of the transmission module through the receiving space 10, and a joystick 6 connected between the energy module and the operating head 5.

In the embodiment, the grass trimmer 100 is a DC grass trimmer. The energy module includes a battery pack detachably attached to an end portion of the grass trimmer 100. The housing 1 includes a battery-pack insertion portion 19 located at a lower part of the receiving space 10. The battery-pack insertion portion 19 is electrically connected to the battery pack through a terminal and configured to transmit an electrical power to the power module through a cable line. Of course, the present disclosure is also applicable to an alternating current (AC) grass trimmer. An energy module of the AC grass trimmer includes a power cord configured to be externally connected to a power outlet.

The receiving space 10 is formed or defined inside the housing 1. The power module includes a motor 2 received in the receiving space 10. The motor 2 is configured to receive an electrical energy provided by the battery pack. The motor 2 includes a front end and a rear end opposite to the front end, the front end is closer to the operating head 5 than the rear end, and the motor 2 is configured to outwardly output a rotation power through the front end. The motor 2 may be a brushless motor or a brushed motor. The motor 2 may be an inner-rotor motor, or may also be an outer-rotor motor. In this embodiment, the motor 2 is the outer-rotor motor. The motor 2 includes a motor cover 23. The motor 2 is arranged at an end of the housing 1 and adjacent to the battery-pack insertion portion 19. The motor 2 is connected to the battery-pack insertion portion 19 through the cable line.

The power module is configured to transmit the power to the operating head 5 through the transmission module. The transmission module includes a transmission mechanism 4 engaged with a motor output shaft of the motor 2. The transmission mechanism 4 includes a gear reduction system. After several stages of gear reduction, the rotation power is transmitted to the operating head 5 to enable the operating head 5 to rotate to drive a blade or a trimmer rope to mow a lawn. In the embodiment, the transmission module is divided into two parts, one of the two parts is arranged adjacent to the motor output shaft and arranged at an end with the energy module, and the other one of the two parts is arranged adjacent to the operating head 5. Of course, in other embodiments, this transmission system may also be wholly arranged at an end with the operating head, or wholly arranged at the end with the energy module.

The control module includes a control board 3 connected to the motor 2 and a control switch 7 connected to the control board 3. A user may transmit a signal to the control board 3 by operating the control switch 7 to enable the control board 3 to control an operation of the motor 2. The control board 3 is arranged in the receiving space 10 of the housing 1 and located at a rear side of the motor 2. Due to a large size and a heavy mass of the control board 3, an over-temperature protection may be easily caused as a result of temperature rising rapidly, resulting that an operation of the grass trimmer 100 is interrupted frequently and an operating efficiency of the user is affected thereby. In terms of a technical problem, i.e., how to reasonably arrange the control board 3 to effectively dissipate the heat thereof and avoid an adverse effect thereof on the motor 2, some embodiments of the present disclosure provide a solution as follows.

Figures 2, 3:
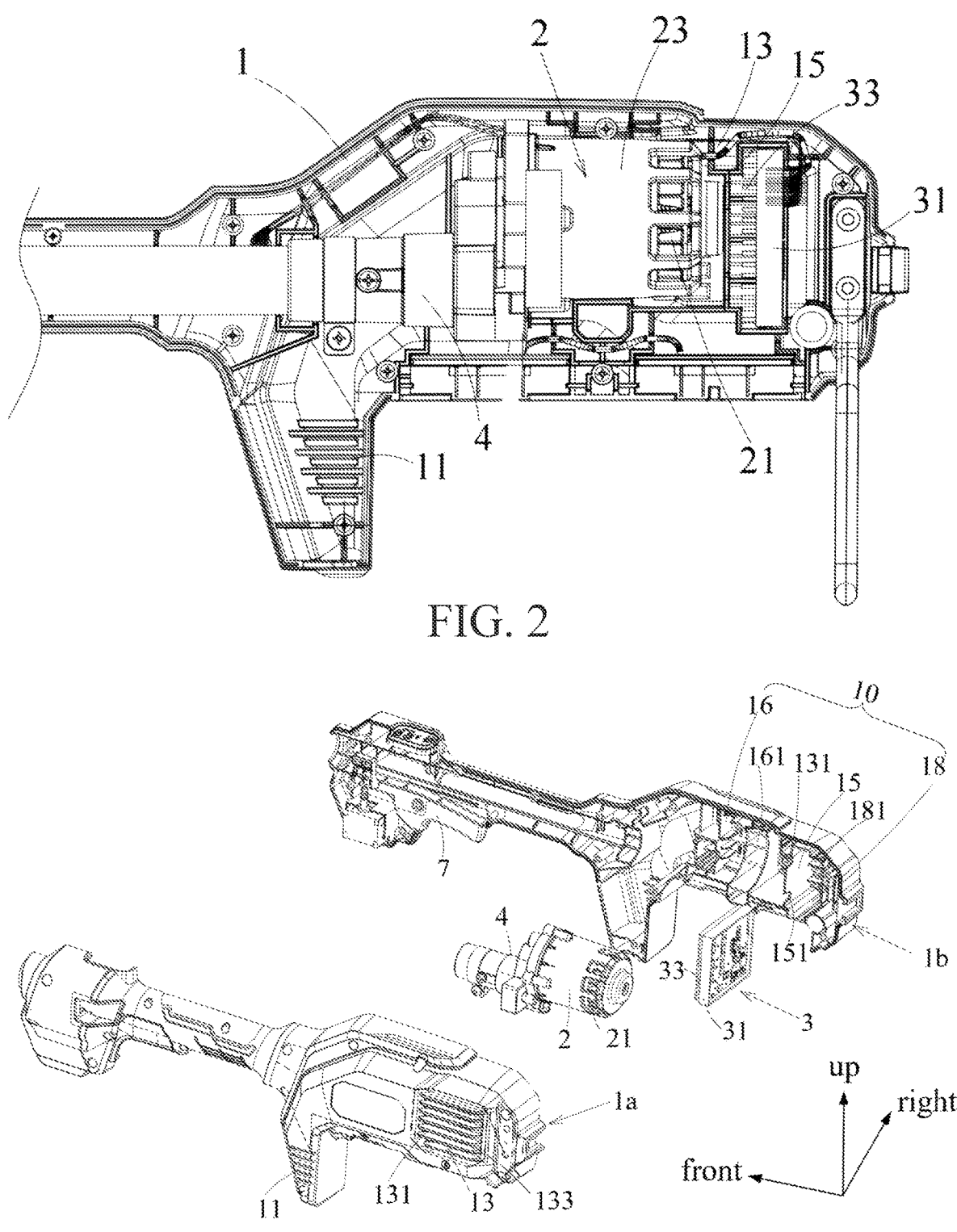
FIG. 2 is a structural schematic view of a rear end of the grass trimmer shown in FIG. 1 with a half housing removed.
FIG. 3 is an explosive structural schematic view of the rear end of the grass trimmer shown in FIG. 1.

As shown in FIG. 2, an air inlet 11 and a heat-dissipation vent 13 are defined on the housing 1. The heat-dissipation vent 13 is a one-piece structure. A heat-dissipation fan 21 is arranged on the rear end of the motor 2 and located in the motor cover 23. The heat-dissipation fan 21 is driven by the motor 2 to rotate to generate a negative pressure, and thus a motor heat-dissipation passage in which an airflow flows from the air inlet 11 to the heat-dissipation vent 13 is formed. During the operation of the motor 2, the heat-dissipation fan 21 rotates by the force of the motor 2, such that the negative pressure is generated at the rear end of the motor 2, which enables the airflow to enter into the motor heat-dissipation passage from the air inlet 11 and carry away the heat of the motor 2 when flowing through the motor 2, and finally flow out of the motor heat-dissipation passage from the heat-dissipation vent 13. In the embodiment, the air inlet 11 is located at the front of the motor 2, while the heat-dissipation vent 13 is located at the rear of the motor 2. In this way, the motor 2 is located inside, or further located in a middle of the motor heat-dissipation passage, a heat-dissipation airflow may carry or take away more heat of the motor 2 when flowing from the front end of the motor 2 to the rear end of the motor 2, which promotes a temperature-dropping and cooling-down process of the motor 2. In the embodiment, the air inlet 11 is located at the front of the battery-pack insertion portion 19.

In the embodiment, the housing 1 is provided with an inner wall and a partition 15 extending from the inner wall into the receiving space 10. The partition 15 is located between the motor 2 and the control board 3 to enable the control board 3 to be independent of a heat-dissipation airflow passage of the motor 2. The partition 15 may be configured to divide or separate the heat-dissipation vent 13 into a first heat-dissipation vent 131 adjacent to the motor 2 and a second heat-dissipation vent 133 adjacent to the control board 3. A ventilation hole 151 facing the heat-dissipation fan 21 is defined in the partition 15. The second heat-dissipation vent 133, the ventilation hole 151, and the first heat-dissipation vent 131 form a control-board heat-dissipation passage. The control board 3 is located in the control-board heat-dissipation passage. With this configuration, the control board 3 is enabled to be independent of the heat-dissipation airflow passage of the motor 2. Moreover, the negative pressure generated during the rotation of the heat-dissipation fan 21 may be used to separately form a heat-dissipation airflow passage which is configured to allow the airflow to flow through the control board 3. In this way, the heat-dissipation airflow passage of the control board 3 and the heat-dissipation airflow passage of the motor 2 are non-interfered with each other, and both the heat of the motor 2 and the heat of the control board 3 may be timely and effectively dissipated, such that the defects of the related art are overcome.

In the embodiment, the airflow in the control-board heat-dissipation passage flows into the control-board heat-dissipation passage from the second heat-dissipation vent 133 and flows out of the control-board heat-dissipation passage from the first heat-dissipation vent 131 after flowing through the control board 3, the ventilation hole 151, and the heat-dissipation fan 21 in sequence.

In addition, the airflow in the motor heat-dissipation passage flows into the motor heat-dissipation passage from the air inlet 11 and flows out of the motor heat-dissipation passage from the first heat-dissipation vent 131 after flowing through the motor 2 and the heat-dissipation fan 21 in sequence.

As shown in FIG. 3, the housing 1 includes a first housing 1a and a second housing 1b engaged with the first housing 1a. When the power tool is placed as FIG. 3, the first housing 1a may be arranged at a left side and the second housing 1b may be arranged at a right side. Each of the first housing 1a and second housing 1b has a heat-dissipation vent 13. The heat-dissipation vent 13 of the first housing 1a and the heat-dissipation vent 13 of the second housing 1b are symmetrical to each other. The heat-dissipation fan 21 and the control board 3 are located between the heat-dissipation vent 13 of the first housing 1a and the heat-dissipation vent 13 of the second housing 1b. In this way, airflows entering into the receiving space from heat-dissipation vents 133 at both the left side and the right side substantially flows from an edge of the control board 3 to a center of the control board

3, and two airflows are converged at the center of the control board 3, which improves a temperature-dropping efficiency of the control board 3.

The heat-dissipation fan 21 is located between the first heat-dissipation vent 131 of the first housing 1a and the first heat-dissipation vent 131 of the second housing 1b. The control board 3 is disposed between the second heat-dissipation vent 133 of the first housing 1a and the second heat-dissipation vent 133 of the second housing 1b. Each of the first housing 1a and the second housing 1b is provided with the partition 15, the partition 15 at the left side meets or contacts or abuts against the partition 15 at the right side at a center of the receiving space 10. The ventilation hole 151 in the partition 15 at the left side and the ventilation hole 151 in the partition 15 at the right side are combined into a hole having a continuous contour, such as a circle-shaped hole or an oval-shaped hole, such that the airflows converged herein flow from the second heat-dissipation vents 133 to the first heat-dissipation vents 131 through the combined ventilation holes 151. In this way, the heat of the control board 3 is carried away from the receiving space 10 of the housing 1.

As shown in FIG. 3, the control board 3 is arranged facing the heat-dissipation fan 21. The ventilation hole 151 is located at a position of an edge of the partition 15 which is closest to the heat-dissipation fan 21.

The control board 3 includes a reference surface 31 arranged facing towards the motor 2 and a plurality of heat-dissipation pillars 33 extending from the reference surface 31 towards the motor 2. The plurality of heat-dissipation pillars 33 are staggered from each other to increase a contact area between the control board 3 and a cooling airflow. The heat-dissipation pillars 33 include or are made of metal materials to achieve a better heat conduction. Staggered arrangement of the heat-dissipation pillars 33 enables the cooling airflow to flow through more heat-dissipation pillars 33 to carry away heat of surfaces of the heat-dissipation pillars 33. The reference surface 31 has a flat plate shape, which also helps to increase a heat-dissipation area and avoid a damage of a circuit on the control board 3.

The partition 15 divides or separates the receiving space 10 into a motor holding cavity 16 and a control-board holding cavity 18. The motor holding cavity 16 is provided with a first rib portion 161 inwardly protruding from the inner wall, and the motor 2 is received in the motor holding cavity 16 and limited to the first rib portion 161. The control-board holding cavity 18 is provided with a second rib portion 181 inwardly protruding from the inner wall, and the control board 3 is received in the control-board holding cavity 18 and limited to the second rib portion 181. The receiving space 10 is separated or divided into the motor holding cavity 16 and the control-board holding cavity 18 by the partition 15, and both of two holding cavities are provided with rib portions, respectively, so as to respectively fix the motor 2 and the control board 3. Of course, the arrangement of the rib portions also takes heat dissipation of both the motor 2 and the control board 3 into account, to enable both the control-board heat-dissipation passage and the motor heat-dissipation passage to be unobstructed.

In this way, the negative pressure of the heat-dissipation fan 21 enables external air at a side with the control board 3 to be drawn into the control-board holding cavity 18 through the two heat-dissipation vents 133 at the left side and the right side, and to flow through the heat-dissipation pillars 33 along a direction substantially parallel to the reference surface 31 of the control board 3 and be converged at a middle position of the control board 3, flow into the rear end of the motor 2 through the ventilation holes 151, and flow out of the housing 1 along the direction of the control-board heat-dissipation passage from the first heat-dissipation vents 131.

In summary, the control-board heat-dissipation passage and the motor heat-dissipation passage are two airflow passages utilizing the negative pressure of the heat-dissipation fan 21. In the motor heat-dissipation passage, the air enters into the motor holding cavity 16 from an outside of the housing 1 through the air inlet 11 located at the front of the motor 2, flows from the front end of the motor 2 to the rear end of the motor 2, and ultimately carries the heat of the motor 2 and flow out of the housing 1 through the first heat-dissipation vent 131. The control-board heat-dissipation passage and the motor heat-dissipation passage are independent of each other and do not interfere with each other. Both the control-board heat-dissipation passage and the motor heat-dissipation passage may efficiently accomplish the heat dissipation. In this way, a downtime frequency of the grass trimmer 100 may be reduced and the operating efficiency of the user may be improved.

The present disclosure is not limited to specific embodiments described above. One of ordinary skill in the art may easily understand that the power tool of the present disclosure also has many alternative schemes without departing from the principle and scope of the present disclosure. The protection scope of the present disclosure is subject to contents of claims.

What is claimed is:

1. A power tool, comprising:
   a housing, defining a receiving space inside, and an air inlet and a heat-dissipation vent being defined on the housing;
   a motor, received in the receiving space, comprising a front end and a rear end, and configured to output a rotation power through the front end;
   a heat-dissipation fan, mounted at the rear end of the motor and capable of being driven by the motor to rotate and generate a negative pressure, and wherein a motor heat-dissipation passage in which a first airflow is capable of flowing from the air inlet to the heat-dissipation vent is formed in the receiving space;
   a control board, arranged in the receiving space and located at a rear side of the motor, and configured to control an operation of the motor;
   wherein the housing is provided with an inner wall and a partition extending from the inner wall into the receiving space, the partition is located between the motor and the control board and configured to enable the control board to be independent of the motor heat-dissipation passage and separate the heat-dissipation vent into a first sub heat-dissipation vent adjacent to the motor and a second sub heat-dissipation vent adjacent to the control board, wherein a ventilation hole facing the heat-dissipation fan is defined in the partition, the second sub heat-dissipation vent, the ventilation hole, and the first sub heat-dissipation vent form a control-board heat-dissipation passage, and the control board is located in the control-board heat-dissipation passage;
   the first sub heat-dissipation vent and the second sub heat-dissipation vent are arranged side-by-side and adjacent to each other;
   wherein the partition divides the receiving space into a motor holding cavity and a control-board holding cavity, the motor holding cavity is provided with a first rib portion protruding from the inner wall into the receiving space, and the motor is received in the motor holding cavity and fixed by the first rib portion; and the control-board holding cavity is provided with a second rib portion protruding from the inner wall into the receiving space, and the control board is received in the control-board holding cavity and fixed by the second rib portion.

2. The power tool according to claim 1, wherein a second airflow in the control-board heat-dissipation passage is capable of flowing into the control-board heat-dissipation passage from the second sub heat-dissipation vent, and flowing out of the control-board heat-dissipation passage from the first sub heat-dissipation vent after flowing through the control board, the ventilation hole, and the heat-dissipation fan in sequence.

3. The power tool according to claim 1, wherein the housing comprises a first housing and a second housing engaged with the first housing, each of the first housing and second housing defines the first sub heat-dissipation vent and the second sub heat-dissipation vent, the first sub heat-dissipation vent defined in the first housing and the first sub heat-dissipation vent defined in the second housing are symmetrical to each other, the second sub heat-dissipation vent defined in the first housing and the second sub heat-dissipation vent defined in the second housing are symmetrical to each other, and the heat-dissipation fan and the control board are located between the heat-dissipation vent of the first housing and the heat-dissipation vent of the second housing.

4. The power tool according to claim 3, wherein the heat-dissipation fan is located between the first sub heat-dissipation vent of the first housing and the first sub heat-dissipation vent of the second housing, and the control board is located between the second sub heat-dissipation vent of the first housing and the second sub heat-dissipation vent of the second housing.

5. The power tool according to claim 3, wherein the control board is arranged facing the heat-dissipation fan and the ventilation hole is located at an edge of the partition adjacent to the heat-dissipation fan.

6. The power tool according to claim 3, wherein each of the first housing and the second housing is provided with the partition, the partition in the first housing meets the partition in the second housing at a center of the receiving space, and the ventilation hole defined in the partition in the first housing and the ventilation hole defined in the partition in the second housing are combined into a circle shape or an oval shape.

7. The power tool according to claim 1, wherein the control board comprises a reference surface facing towards the motor and a plurality of heat-dissipation pillars extending from the reference surface towards the motor, and the plurality of heat-dissipation pillars are staggered from each other to increase a contact area between the control board and a second airflow.

8. The power tool according to claim 1, wherein the motor is an external-rotor motor and comprises a motor cover, the heat-dissipation fan is located in the motor cover, the housing comprises a battery-pack insertion portion, the battery-pack insertion portion is located at a lower part of the receiving space, and the air inlet is located at the front of the battery-pack insertion portion.

9. The power tool according to claim 1, wherein the first airflow in the motor heat-dissipation passage is capable of flowing into the motor heat-dissipation passage from the air inlet and flowing out of the motor heat-dissipation passage from the first sub heat-dissipation vent after flowing through the motor and the heat-dissipation fan in sequence.

10. The power tool according to claim 1, comprising:
a transmission mechanism, located in the receiving space and connected to the front end of the motor; and
an operating head, driven by the transmission mechanism;
wherein the motor is configured to drive the operating head to operate through the transmission mechanism.

11. The power tool according to claim 1, wherein the air inlet is located at the front end of the motor, the first sub heat-dissipation vent is located at the rear end of the motor and at a front end of the second sub heat-dissipation vent.

12. A power tool, comprising:
a housing, defining an air inlet and a heat-dissipation vent defining a first sub heat-dissipation vent and a second sub heat-dissipation vent;
a motor, received in the housing and disposed adjacent to the first sub heat-dissipation vent, comprising a front end and a rear end, and configured to output a rotation power through the front end;
a heat-dissipation fan, mounted at the rear end of the motor and capable of rotating and generating a negative pressure;
a control board, arranged in the housing, located at a rear side of the heat-dissipation fan, and disposed adjacent to the second sub heat-dissipation vent;
wherein the housing comprises a partition, the partition separates the heat-dissipation vent into the first sub heat-dissipation vent and the second sub heat-dissipation vent, the first sub heat-dissipation vent and the second sub heat-dissipation vent are arranged side-by-side and adjacent to each other, and the first sub heat-dissipation vent is fluidly coupled to the second sub heat-dissipation vent through the partition; and
wherein in case where the heat-dissipation fan rotates and generates a negative pressure, a motor heat-dissipation passage and a control-board heat-dissipation passage independent of the motor heat-dissipation passage are formed, the air inlet is an inlet of a first airflow which is able to flow in the motor heat-dissipation passage, the second sub heat-dissipation vent is an inlet of a second airflow which is able to flow in the control-board heat-dissipation passage, and the first sub heat-dissipation vent is an outlet through which the first airflow and the second airflow are capable of flowing out of the motor heat-dissipation passage and the control-board heat-dissipation passage, respectively;
wherein the housing comprises a first housing and a second housing engaged with the first housing, each of the first housing and second housing defines the first sub heat-dissipation vent and the second sub heat-dissipation vent, the first sub heat-dissipation vent defined in the first housing and the first sub heat-dissipation vent defined in the second housing are symmetrical to each other, the second sub heat-dissipation vent defined in the first housing and the second sub heat-dissipation vent defined in the second housing are symmetrical to each other, and the heat-dissipation fan and the control board are located between the heat-dissipation vent of the first housing and the heat-dissipation vent of the second housing.

13. The power tool according to claim 12, wherein a ventilation hole is defined in the partition, and the first sub heat-dissipation vent is fluidly coupled to the second sub heat-dissipation vent through the partition via the ventilation hole.

14. The power tool according to claim 12, wherein the heat-dissipation fan is located between the first sub heat-dissipation vent of the first housing and the first sub heat-dissipation vent of the second housing, and the control board is located between the second sub heat-dissipation vent of the first housing and the second sub heat-dissipation vent of the second housing.

15. The power tool according to claim 12, wherein each of the first housing and the second housing is provided with the partition, the partition in the first housing meets the partition in the second housing at a center of the receiving space, and the ventilation hole defined in the partition in the first housing and the ventilation hole defined in the partition in the second housing are combined into a circle shape or an oval shape.

16. The power tool according to claim 12, wherein the control board comprises a reference surface facing towards the motor and a plurality of heat-dissipation pillars extending from the reference surface towards the motor, and the plurality of heat-dissipation pillars are staggered from each other to increase a contact area between the control board and a second airflow.

17. A grass trimmer, comprising:
a housing, defining a heat-dissipation vent;
a motor, received in the housing, comprising a front end and a rear end;
a heat-dissipation fan, mounted at the rear end of the motor and capable of rotating and generating a negative pressure;
a control board, arranged in the housing, located at a rear side of the heat-dissipation fan;
wherein the housing comprises a partition located between the motor and the control board, and the partition separates the heat-dissipation vent into a first sub heat-dissipation vent and a second sub heat-dissipation vent adjacent to the first sub heat-dissipation vent, such that when the heat-dissipation fan rotates and generates a negative pressure, a motor heat-dissipation passage and a control-board heat-dissipation passage non-interfered with the motor heat-dissipation passage are formed, and a first airflow and a second airflow are capable of flowing out of the motor heat-dissipation passage and the control-board heat-dissipation passage respectively, from the first sub heat-dissipation vent; wherein the motor is disposed in the motor heat-dissipation passage, and the control board is disposed in the control-board heat-dissipation passage;
the first sub heat-dissipation vent and the second sub heat-dissipation vent are arranged side-by-side and adjacent to each other;
wherein the partition divides the receiving space into a motor holding cavity and a control-board holding cavity, the motor holding cavity is provided with a first rib portion protruding from the inner wall into the receiving space, and the motor is received in the motor holding cavity and fixed by the first rib portion; and the control-board holding cavity is provided with a second rib portion protruding from the inner wall into the receiving space, and the control board is received in the control-board holding cavity and fixed by the second rib portion.

* * * * *